(12) United States Patent
Marshall et al.

(10) Patent No.: US 7,436,411 B2
(45) Date of Patent: Oct. 14, 2008

(54) APPARATUS AND METHOD FOR RENDERING A VIDEO IMAGE AS A TEXTURE USING MULTIPLE LEVELS OF RESOLUTION OF THE VIDEO IMAGE

(75) Inventors: Carl S. Marshall, Portland, OR (US); Ram Rao, Portland, OR (US); Christopher Cormack, Hillsboro, OR (US); Suresh Rangarajulu, Portland, OR (US); Peter Munguia, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 213 days.

(21) Appl. No.: 11/393,173

(22) Filed: Mar. 29, 2006

(65) Prior Publication Data

US 2007/0229530 A1    Oct. 4, 2007

(51) Int. Cl.
  *G09G 5/00*   (2006.01)
  *G06T 15/10*  (2006.01)
  *G06K 9/36*   (2006.01)
  *H04N 5/445*  (2006.01)
  *H04N 5/46*   (2006.01)

(52) U.S. Cl. .................. 345/587; 345/582; 345/428; 345/519; 345/552; 348/556; 348/561; 348/563; 382/285; 382/282; 382/260; 382/274

(58) Field of Classification Search ......... 345/418–419, 345/426, 428, 581–582, 587, 589, 506, 501–502, 345/519–520, 547–552, 690, 698, 660, 671; 348/526, 556, 561, 575, 563–569, 429–430; 382/232–233, 254, 260, 274, 276
See application file for complete search history.

(56) References Cited

U.S. PATENT DOCUMENTS

| 5,696,892 | A  | * | 12/1997 | Redmann et al. | 345/582 |
|---|---|---|---|---|---|
| 5,877,771 | A  | * | 3/1999 | Drebin et al. | 345/586 |
| 6,721,454 | B1 | * | 4/2004 | Qian et al. | 382/224 |
| 2005/0128213 | A1 | * | 6/2005 | Barenbrug et al. | 345/587 |
| 2006/0001673 | A1 | * | 1/2006 | Brand | 345/582 |
| 2006/0092320 | A1 | * | 5/2006 | Nickerson et al. | 348/441 |
| 2007/0019740 | A1 | * | 1/2007 | Budagavi | 375/240.25 |
| 2007/0035707 | A1 | * | 2/2007 | Margulis | 353/122 |

* cited by examiner

*Primary Examiner*—Wesner Sajous
(74) *Attorney, Agent, or Firm*—Blakely, Sokoloff, Taylor & Zafman LLP (57) ABSTRACT

A method and apparatus to generate one or more graphics textures of a video image, wherein graphics textures have differing resolutions, and to render the video image as a graphics texture using the one or more graphics textures of differing resolutions. The one or more graphics textures have different resolutions, for example, a base resolution and one or more scaled resolutions. The graphics texture may be rendered and displayed on a surface of a multi-dimensional graphics object that may be manipulated on a display.

30 Claims, 10 Drawing Sheets

APPARATUS AND METHOD FOR RENDERING A VIDEO IMAGE AS A TEXTURE USING MULTIPLE LEVELS OF RESOLUTION OF THE VIDEO IMAGE

BACKGROUND

There is a growing preference among consumers to have a picture-in-picture (PIP) window or a picture-out-of-picture (POP) window. In particular, the preference of consumers is to have one or more PIP or POP windows rotate into the display because it allows depth cues when compared to the primary video so that the videos (primary and secondary) do not appear to compete for the same real-estate area of the display screen. With the growing increase in digital media products, such as internet-protocol Set-top-boxes (IP-STBs) and Digital Televisions (DTVs), quality of video images have been enhanced. Correspondingly, consumer demand is growing to have increased quality of video, enhanced capabilities of graphical user interfaces (GUIs), and enhanced video presentation techniques, such as the PIP window feature.

Conventional display processing engines, typically, only filter decoded video at one resolution to be displayed on a display. One resolution is sufficient when the video surface is a planar rectangular or square shape on the display; however, one resolution is not sufficient for non-rectangular or non-square shapes on the display, for example, displaying the image on multi-dimensional graphics object.

In computer graphics, there are filtering techniques for generating multiple images having different resolutions, such as point-sampling filtering, bi-linear filtering, tri-linear filtering, or anisotropic filtering. These techniques, however, are typically used to filter graphic images, and not video images. In computer graphics and video processing applications or hardware, there are no techniques to combine both filtering, such as polyphase filtering, of video images to generate multiple video images of different resolutions as textures, and rendering the multiple video images as graphics textures to give 3-D capabilities to the video surface.

BRIEF DESCRIPTION OF THE DRAWINGS

The present invention is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the spirit and scope of the present invention.

Embodiments of a method and apparatus are described to decoding of video frames using the display processing engine to create polyphase filtered versions of the video frame into N lower-resolution frames of data. The variable N indicates the discrete number of resolutions. The N levels of video data will be used by the 3-D/2-D graphics hardware as mipmap levels to display the video as a texture at various depth levels. In one embodiment, the method and apparatus are configured to generate one or more graphics textures of a video image, where the graphics textures have differing resolutions, and to render the video image as a graphics texture using the one or more graphics textures of differing resolutions. The one or more graphics textures have different resolutions; for example, a base resolution and one or more scaled resolutions (e.g., lower resolutions than the base resolution). The graphics texture may be rendered and displayed on a surface of a multi-dimensional graphics object that may be manipulated on a display.

Figure 2:
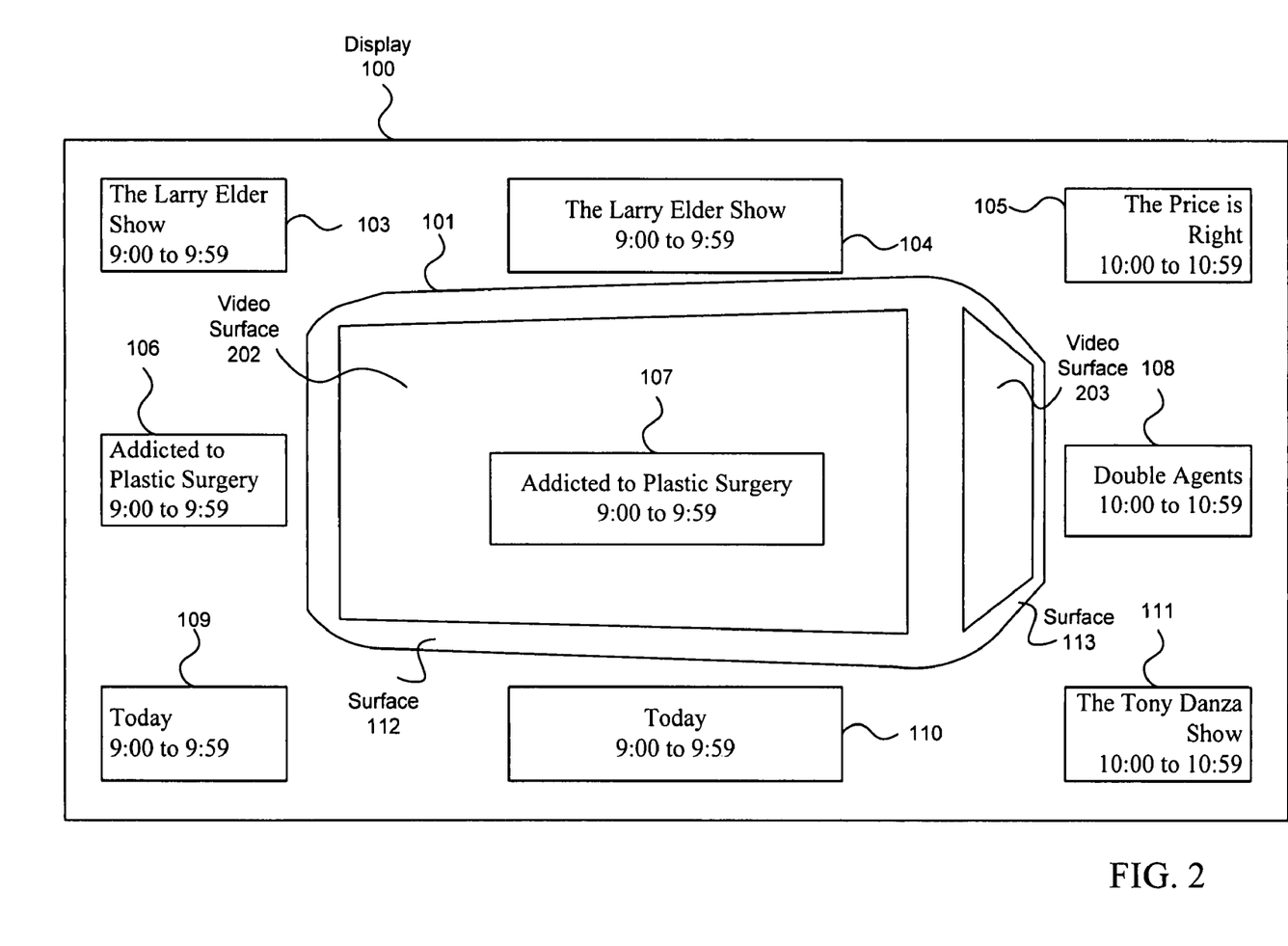
FIG. 2 illustrates the display of FIG. 1 having a rendered video texture, having multiple mipmap levels of the video image on the surface of the multi-dimensional graphics object while rotated.

Consumer electronics hardware may be configured to display multiple planes or surfaces of graphics data along with rendering video data as textures. Rendering video data as textures allows the video image to be rotated on the display along with corresponding surface of the multi-dimensional graphics object, as illustrated in FIG. 2. For example, the rotation of the video surface allows, what would be a square/rectangular video surface on the display to have one side "pushed" into the z-axis so that it will now appear as a parallelogram or trapezoid. In other words, one side of the video surface on the display may appear to be farther away from the viewer, while the other side appears to be closer.

In one embodiment, as the video surface on the surface of the graphics object is rotated in three-dimensional (3-D) space as to be farther from the eye of the viewer (e.g., video image is pushed further back along the z-axis), then a lower resolution texture may be used (e.g., using Direct3D) based on the mipmaps generated by the multiple levels of detailed video textures created by the display processing engine.

Figure 1:
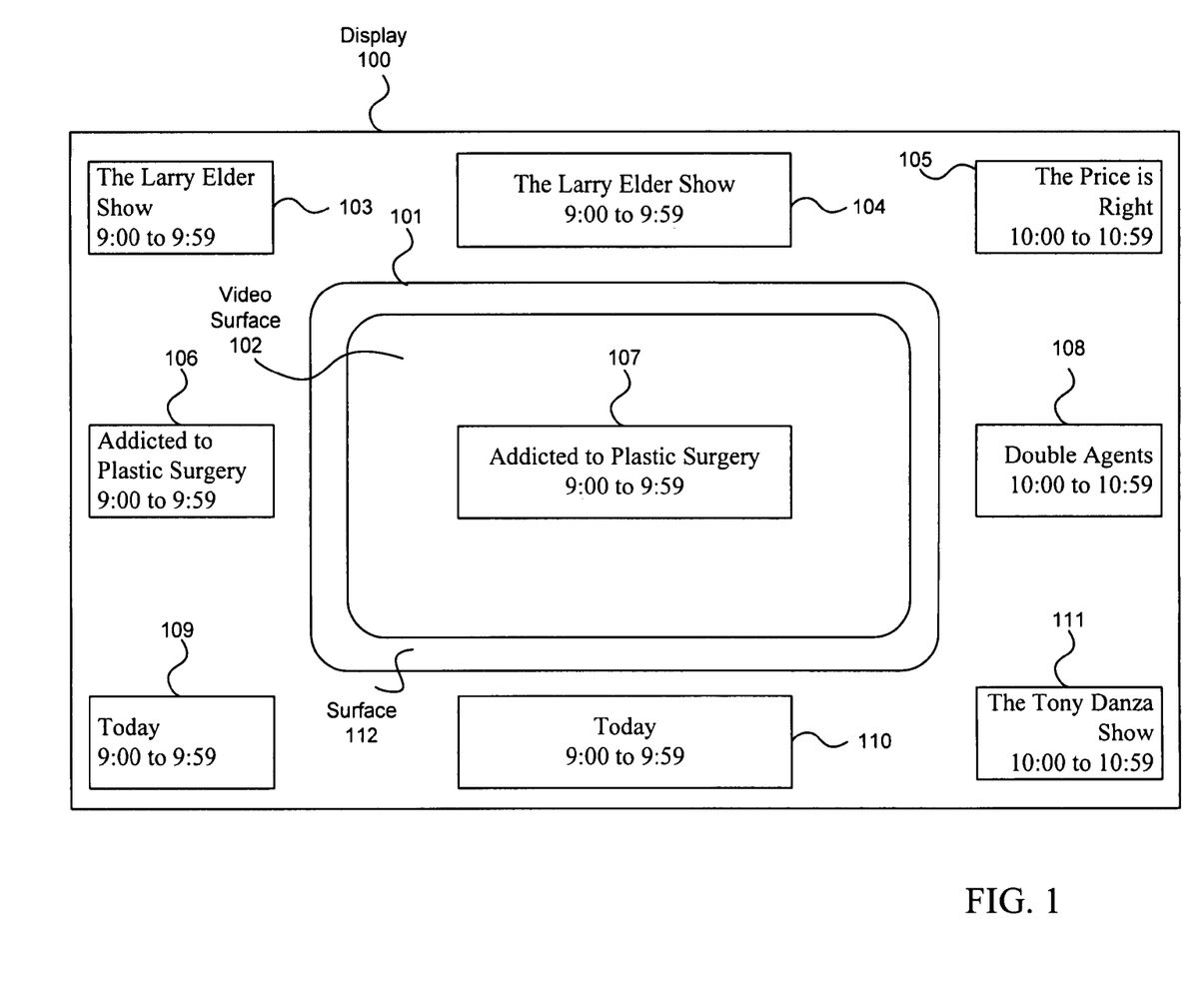
FIG. 1 illustrates one embodiment of a display having a rendered video texture of a video image on a surface of a multi-dimensional graphics object.

FIG. 1 illustrates one embodiment of a display having a rendered video texture of a video image on a surface of a multi-dimensional graphics object. Display 100 includes multi-dimensional graphics object 101, and one or more graphic objects 103-111. The multi-dimensional graphic object 101 may be a 2-dimensional (2-D) graphics object (as illustrated in FIG. 1), or a three-dimensional (3-D) graphics object (as illustrated in FIG. 2). The one or more graphics objects 103-111 may also be multi-dimensional (2-D or 3-D), however, in the illustrated embodiment, these graphic objects are 2-D graphics object of text. Multi-dimensional graphics object 101 may include one or more surfaces. These surfaces may be planar, or rounded (e.g., spherical). In this illustrated embodiment, multi-dimensional graphics object 101 includes a front-side surface 112, which includes a video surface 102, which displays the rendered video image. It should be noted that rendered video image may be displayed on a non-planar surface, such as a surface of a spherical or rounded surface. Alternatively, the rendered video image may be display on an arbitrary surface of the multi-dimensional graphics object. Because the multi-dimensional graphics object 101 is not rotated in the z-direction (e.g., tilted away from the eye of the viewer), the video is at one particular depth for the entire video surface 102. Accordingly, only one video resolution is needed to render the video image onto the video surface 102.

FIG. 2 illustrates the display of FIG. 1 having a rendered video texture, having multiple mipmap levels of the video image on one rotated surface of the multi-dimensional graphics object. Display 100 of FIG. 2 also includes multi-dimensional graphics object 101, and one or more graphic objects 103-111. The multi-dimensional graphics object 101, however, is rotated in the z-direction (e.g., tilted away from the eye of the viewer). Accordingly, multi-dimensional graphics object 101 includes one or more surfaces. The front-side surface 112 is rotated back away from the eye of the viewer, in particular, the left-side of the front-side surface 112 becomes smaller by appear to be at a different depth than the depth of the right-side of the front-side surface 112. It should be noted that the multi-dimensional graphics object 101 may be rotated in different directions other than illustrated in FIG. 2. In this particular embodiment, the multi-dimensional graphics object 101 is a cube having planar surfaces on each side of the cube. Because the front-side surface 112 has been rotated back into the screen (display), the multi-dimensional graphics object 101 exposes an additional surface 113, including video surface 203. Video surface 203 may include a different video image from a different channel or from the same channel at a different time. For example, this multi-dimensional graphics object 101 may be used as a graphics user interface (GUI) for selecting which television program. The graphic objects 103-111 may include the text of the possible programs that can be selected. As one graphic object is selected, for example, 106, the multi-dimensional graphics object 101 rotates toward the text of graphics object 106. The video images from a different program, for example, 108, may be displayed on the video surface 203 on the surface 113 of multi-dimensional graphics object 101. Similarly, the multi-dimensional graphics object 101 could be rotated up and down on the display 100, which may result in displaying video images from a different channel, such as indicated in graphics objects 104 or 110 in an additional planar surface of the multi-dimensional graphics object 101.

By rotating the video surface 202, having a rectangular or square video surface shape (as illustrated in FIG. 1), by pushing one side of the video surface into the z-axis, the video surface 202 appears as a parallelogram or trapezoid shape, to give depth to the rotated video surface. Rendering video data as textures allows a video surface 202 having the video image to be rotated on the display 100 along with rotating the multi-dimensional graphics object 101, as illustrated in FIG. 2. In other words, one side of the video surface may appear to be farther away from the viewer of the display, while the other side appears to be closer. In order to allow rendering of better video quality for non-rectangular video destinations (e.g., trapezoid, parallelogram, or spherical shapes), different levels of resolution of the video image (e.g., from the filtered mipmaps) may be used to display the most appropriate video texture at a particular depth within the video surface 202.

Figure 3A:
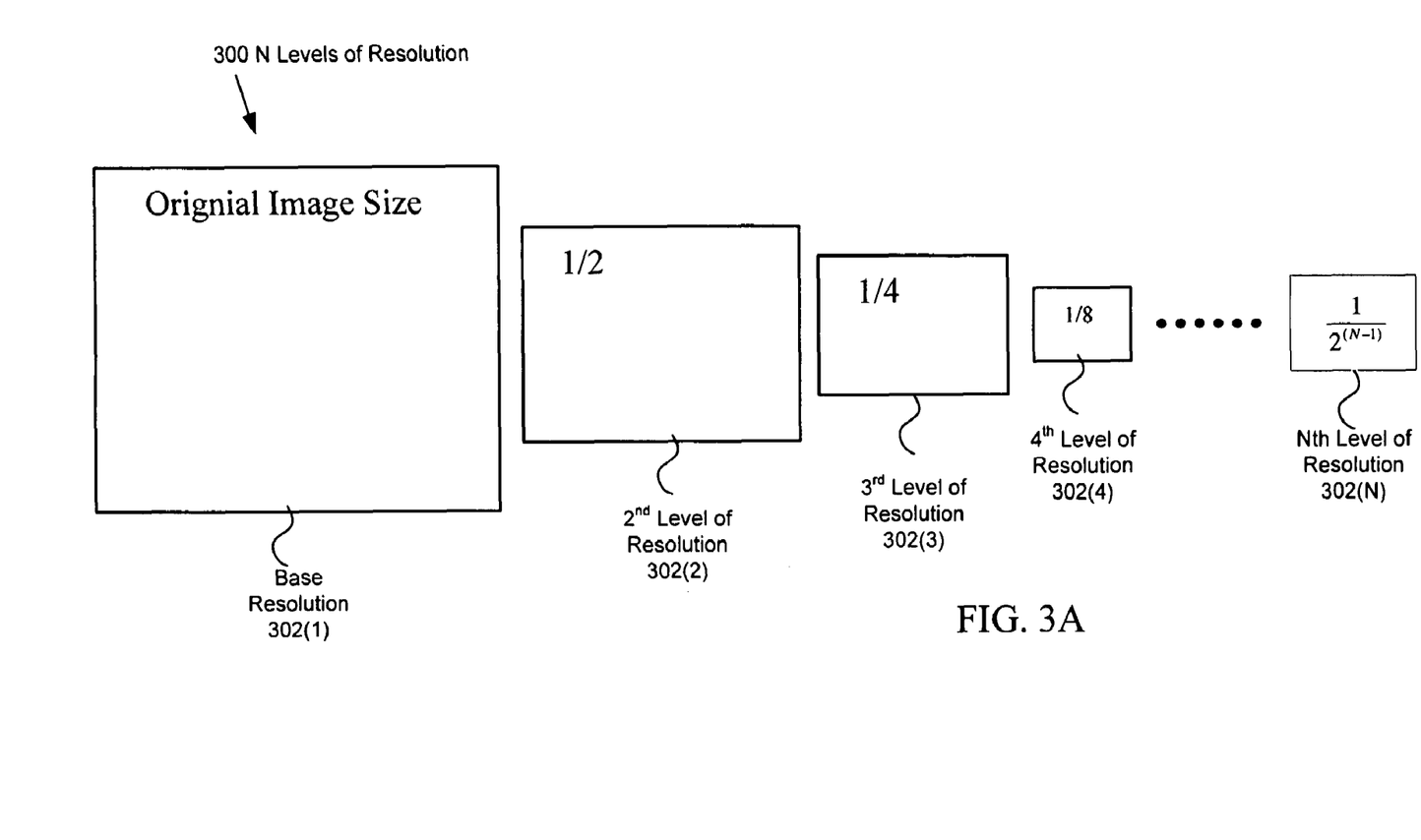
FIG. 3A illustrates one embodiment of multiple levels of resolution of an original image.

FIG. 3A illustrates one embodiment of multiple levels of resolution of an original image. As previously mentioned, to display the most appropriate video texture at a particular depth on a surface (e.g., video surface 202), N-different levels of resolution 300 of the original video image need to be generated, where N is a positive integer value. For example, the original image 302(1) may have a base resolution. One or more filtered images (e.g., scaled images), such as 302(2)-302(N), may be created using the original image size 302(1). In the illustrated embodiment, the resolutions of the images are reduced by ½ each image. In particular, the second image 302(2) is ½ the resolution of the base resolution of the original image 302(1), the third image 302(3) is ¼ the resolution of the base resolution of the original image 302(1), and the fourth image 302(4) is ⅛ the resolution of the base resolution of the original image 302(1). The Nth image 302(N) is a fraction of the base resolution of the original image 302(1), as expressed in the following equation (1).

$$\text{Nth\_Resolution} = \frac{1}{2^{(N-1)}}. \tag{1}$$

In another embodiment, both the height and the width of the base image resolution may be halved, resulting in the subsequent resolutions being ¼, 1/16, etc. It should be noted that other proportions may be used in generating the filtered images having lower resolutions than the base resolution of the original image 302(1). The number of different levels of resolution may be requested by the application and/or graphics rendering hardware.

Filtering the original image into N levels of resolutions 300 may be done using a technique called mipmapping. Mipmapping is a minimization filter to create many levels of resolution of the original texture. In computer graphics, the multiple levels are used based on the depth of the geometry (e.g., video surface 202 or 203) of the video image from the viewpoint of the video surface. As described with filtering (e.g., scaling) the original image 302(1) into multiple (e.g., N) levels of resolutions 302(2)-302(N), similarly, when using mipmapping, multiple mipmap levels may be created that correspond to the different levels of resolutions 300 (e.g., mipmap levels having different levels of resolutions).

Figure 3B:
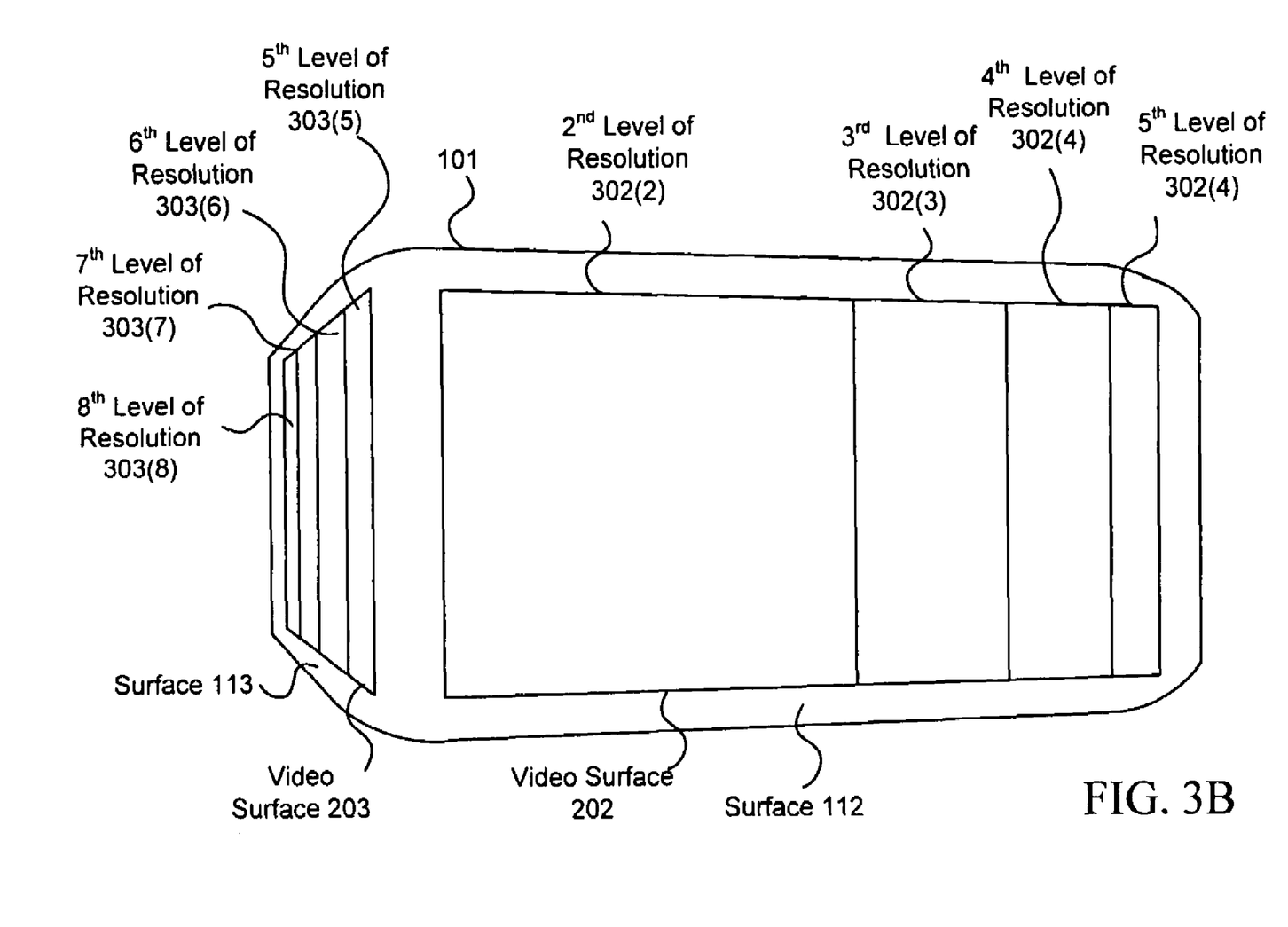
FIG. 3B illustrate one embodiment of a rotated multi-dimensional graphics object having multiple surfaces including multiple mipmap levels of a video image having multiple levels of resolution of the original image.

FIG. 3B illustrate one embodiment of a rotated multi-dimensional graphics object [cube] having multiple surfaces including multiple mipmap levels of a video image having multiple levels of resolution of the original image. This embodiment, illustrates how the multiple levels of resolutions 300 may be used to render and display the original video image 302(1) on a non-rectangular planar video surface 202 on the rotated surface 112 of the multi-dimensional graphics object 101. The multi-dimensional graphics object 101, and correspondingly, the video surface 202, is tilted back into the display 100 on the right side. Because the video surface 202 is not at one particular depth, one or more mipmap levels 302(1)-302(N) may be used to render and display the original video image 302(1) at appropriate depths on the video surface 202. In this particular embodiment, video surface 202 includes 4 sections of the video surface 202 with different resolutions of the original video image 302(1); in particular, the video surface 202 includes the second, third, fourth, and fifth levels of resolution 302(2)-302(5). Similarly, video surface 203 on the surface 113 of the multi-dimensional graphics object 101 includes multiple resolutions of a different original image 303; in particular, the video surface 203 includes the fifth, sixth, seventh, and eighth levels of resolutions 303(5)-303(8) of the original image 303.

Figure 3C:
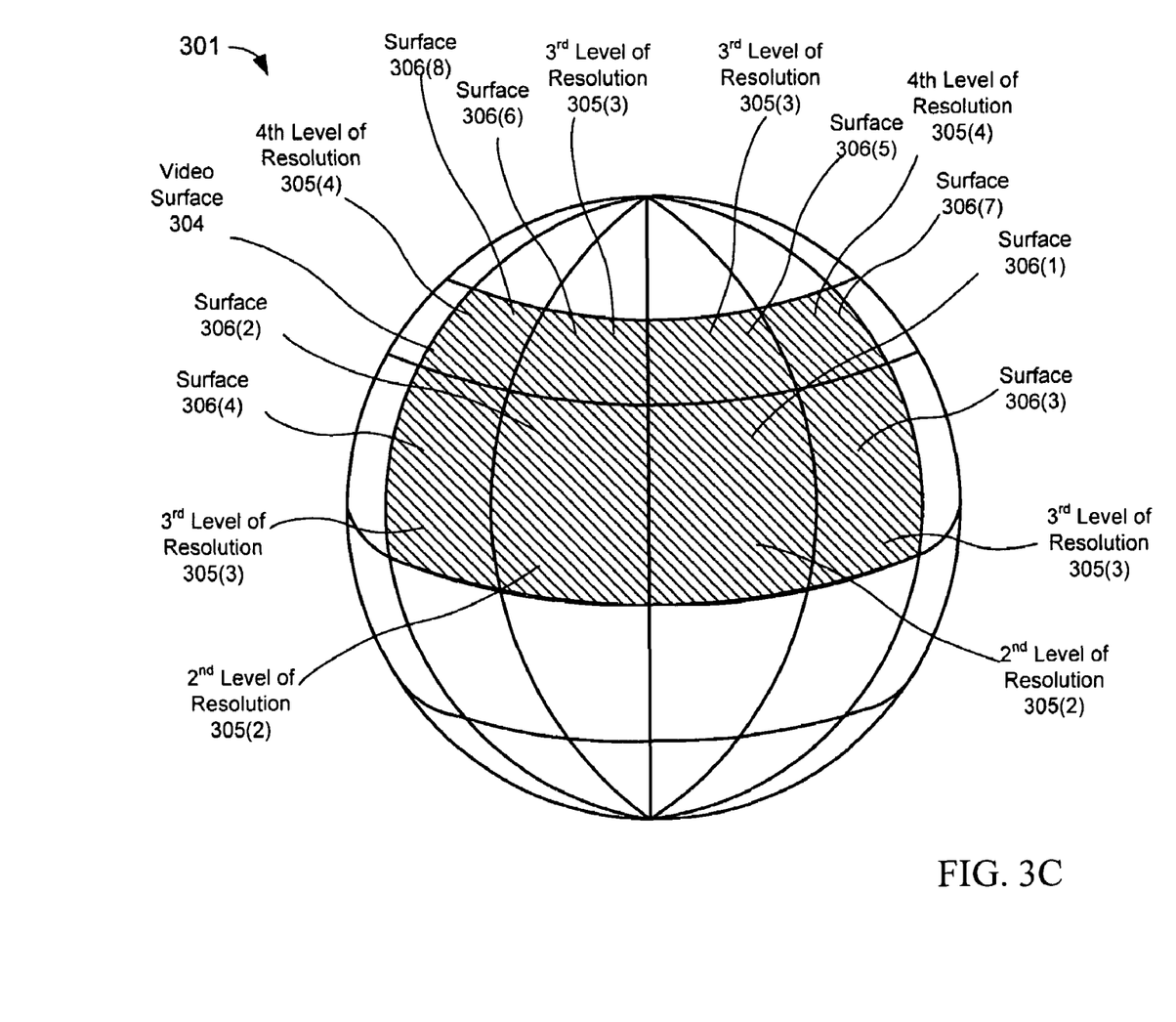
FIG. 3C illustrates one embodiment of a multi-dimensional graphics object having multiple surfaces including multiple mipmap levels of a video image having multiple levels of resolution of the original image.

FIG. 3C illustrates one embodiment of a multi-dimensional graphics object having multiple surfaces including multiple mipmap levels of a video image having multiple levels of resolution of the original image. This embodiment, illustrates how the multiple levels of resolutions 300 may be used to render and display one or more original video images (e.g., 305) on one or more spherical video surfaces (e.g., 304) on a spherical surface of a 3-D graphics sphere 301. The 3-D graphics sphere 301, and correspondingly, the video surfaces 304, includes curved or rounded graphical surfaces 306(1)-306(8) (as illustrated as the hashed sections of the spherical object 301). Because the video surface 304 has multiple sections (e.g., surfaces 306(1)-306(8)) that are not at one particular depth, one or more mipmap levels 305(1)-305(N) may be used to render and display the original video image 305(1) at appropriate depths on the video surfaces 304. In another embodiment, multi-dimensional graphics object may be pushed back into the z-axis, which may also change which layer of the multiple levels is chosen on a per pixel basis. In this particular embodiment, video surface 304 includes 8 sections, as indicated by the 8 surfaces 306(1)-306(8) of the video surface 304 with different resolutions of the original video image 305(1); in particular, the video surface 304 includes the second level of resolution 805(2) on surfaces 306(1) and 306(2), third level of resolution 805(3) on surfaces 306(3), 306(4), 306(5), and 306(6), and fourth level of resolutions 805(4) on surfaces 306(7) and 306(8). Similarly, 3-D graphics sphere 301 may include additional video surfaces on one or more spherical surfaces, including multiple resolutions of different original images. It should be noted that the embodiments described herein are not limited to a video surface having 8 surfaces 306(1)-306(8), but may include more or less number of surfaces. Similarly, the sphere may contain one or more video surfaces on its surface.

Figure 4:
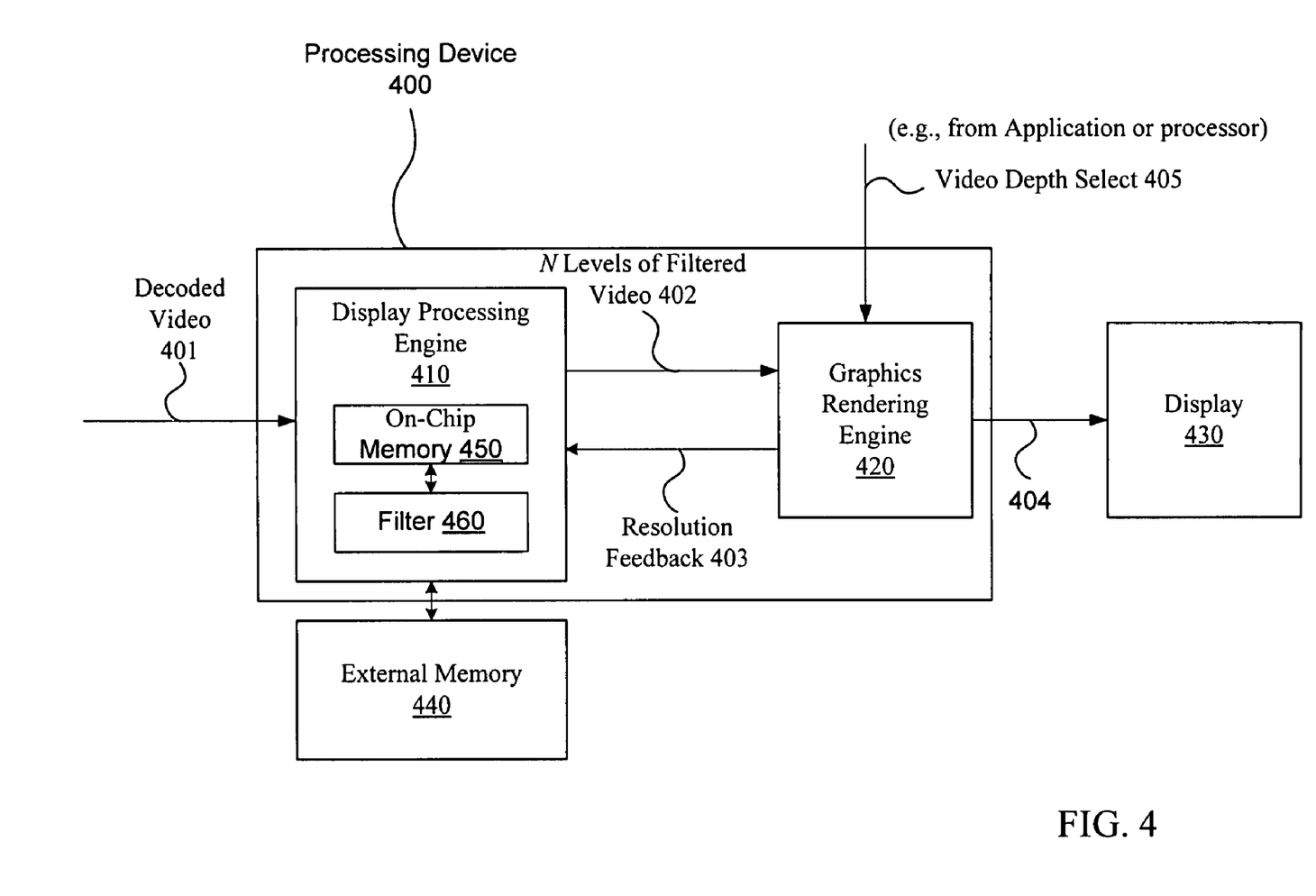
FIG. 4 illustrates a block diagram of one embodiment of a processing device including a display processing engine, and a graphics rendering engine coupled to a display.

FIG. 4 illustrates a block diagram of one embodiment of a processing device including a display processing engine, and a graphics rendering engine coupled to a display. Processing device 400 includes a display processing engine 410, and a graphics rendering engine 420. The display processing engine 410 may be configured to receive decoded video 401 from a video decoder. Alternatively, display processing engine 410 may be configured to receive compressed video and decode the compressed video into the raw video. The display processing engine 410 may also be configured to generate one or more levels of filtered video 402. The one or more levels of filtered video 402 may be one or more mipmaps or mipmap levels of a video image of the decoded video 401. In another embodiment, the one or more levels of filtered video 402 may be one or more graphics textures of the decoded video 401. The one or more graphics textures have differing resolutions, for example, a base resolution and one or more scaled resolutions of the video image.

Graphics rendering engine 420 is coupled to the output of the display processing engine 410, and is configured to receive the one or more levels of filtered video 402 from the display processing engine 410. The graphics rendering engine 420 may be configured to render the video image (e.g., decoded video 401) as a graphics texture using the one or more graphics textures of differing resolutions of the decoded video 401. Graphics rendering engine 420 may also be configured to render the video image (e.g., decoded video 401) as a graphics texture on a surface of a multi-dimensional graphics object (e.g., 101 or 301), using the one or more graphics textures of differing resolutions of the decoded video 401.

Processing device 400 is coupled to display 430. In particular, display 430 is coupled to the output of the graphics rendering engine 420. The display 430 is configured to display the rendered final output with the video image as a graphics texture, as computed by the processing device 400. Display 430 may be a display of a DTV, TV, monitor, handheld multi-media device, personal data assistant (PDA), IP-STB, laptop computers, handheld video players, cable STBs, satellite STBs, handheld gaming devices, or other consumer electronics for displaying video and/or graphics.

In one embodiment, the graphics rendering engine 420 may be configured to receive one or more signals, such as video depth select 405, from the operating system or application, or alternatively, from a processor. The operating system or application may be running on the same electronic device that includes the processing device 400, or alternatively, the operating system or application may be running on a separate electronic device. Similarly, the processor may reside on the same electronic device, or alternatively, on a separate electronic device.

The graphics rendering engine 420 may also be configured to feedback to the display processing engine 410 a resolution feedback 403. The feedback path may be incorporated to allow the graphics rendering engine 420 to set parameters for the display processing engine 410 (e.g., on the polyphase filtering algorithm in the display processing engine 410). The application may position the video surface (e.g., 202, 203, or 304) in 3-D space, and generate a video depth select signal 405 to notify the graphics rendering engine 420, and correspondingly, the graphics rendering engine 420 may determine the base resolution that it needs to correctly render the image for the position on the video surface. The graphics rendering engine 420 may also determine the number (and/or size) of other resolutions needed to correctly render the image at different depths on the video surface. This information may be communicated upstream to the display processing engine 410 via resolution feedback 403. The display processing engine 410 may start with this base resolution (e.g., 302(1)), and create multiple scaled versions (e.g., 302(2)-302(N) of the base resolution. So, for example, the decoded video 401 may be a resolution of 1920×1080. For rendering a particular scene, the graphics rendering engine 420 may determine that it should start with a base image resolution 302(1) of 640× 360, and needs 2 additional resolutions 302(2) of 320×180, and 302(3) of 160×90. The graphics rendering engine 420 may set these properties or parameters on the display processing engine via the feedback path (e.g., resolution feedback 403), such that the appropriately sized images are created for the particular scene that is being rendered to be displayed on the display 430.

In one exemplary embodiment, video images may be decoded and then filtered (e.g., by the display processing engine 410) into multiple mipmaps (e.g., one having a base resolution, and one or more scaled resolutions) in order to display the most appropriate video texture at a particular depth to get a pixel-to-texel ratio of 1:1. In another exemplary embodiment, the video images may be filtered into multiple mipmaps in order to display the most appropriate video texture at a particular depth to get a pixel-to-texel ratio of 2:1, to achieve Nyquist rate.

Nyquist rate is the highest frequency that can be represented in a digital signal of a specified sampling frequency. The Nyquist rate is equal to one-half of the sampling rate. When an analog signal is digitized, only the frequencies in the signal below half the sampling frequency are recorded. In order to reconstruct (interpolate) a signal from a sequence of samples, sufficient samples must be recorded to capture the peaks and troughs of the original signal. If a signal is sampled at less than twice its frequency the reconstructed signal will effectively contribute some noise. This phenomenon is called "aliasing" (the high frequencies are "under an alias"). The Nyquist Theorem is not specific to digitized signals (represented by discrete amplitude levels) but applies to any sampled signal (represented by discrete time values).

Texel is a texture element (e.g., one unit in the texture map). Like a pixel, a texel is the base unit of a graphic, although texels make up textured graphics—graphics that define the surface of three dimensional objects. For example, the base unit of the surface of a 3-D object would be a texel, while the two-dimensional object would consist of pixels. A mipmap is a lower resolution version of a texture map. Many mipmaps can be produced from the original texture map. For example, each mipmap may be half or a quarter the size as the previous mipmap. In another embodiment, each mipmap may be halved in both width and height as the previous mipmap. In 3-D computer graphics texture mapping, MIP maps (also mipmaps) are pre-calculated, optimized collections of bitmap images that accompany a main texture, intended to increase rendering speed and reduce artifacts. They are widely used in 3-D computer games, flight simulators and other 3-D imaging systems. The technique is known as mipmapping.

Mipmapping is a popular anti-aliasing technique for textures. Mipmapping is a minimization filter to create many levels of resolution of the original texture. Mipmapping is performed per pixel, in that resolution interpolation is chosen for each pixel. In computer graphics, the multiple levels are used based on the depth of the geometry (e.g., video surface 202 or 203) of the video image from the viewpoint of the video surface. Typical mipmaps in computer graphics are created using image filtering techniques for synthetic or computer-generated images, such as point-sampling filtering, bi-linear filtering, tri-linear filtering, or anisotropic filtering. Anisotropic filtering may be of much better quality than the other filtering techniques for computer-generated images, but requires many additional samples and about three times (3×) the footprint in memory. In one embodiment, the samples initially may be stored in main memory and then transferred to the graphics memory (e.g., on-chip memory) of the graphics card. Alternatively, the graphics card may include the mipmapping algorithm, and may develop the images in graphics memory. Although, these filtering techniques may be used in reducing the resolution of a video image, these filtering techniques are common techniques for reducing resolution for graphic images. Filtering (e.g., scaling) an image may also be done using video filtering techniques. These techniques are preferable to the image filtering techniques for computer-generated images, in filtering video images, because video images tend to have less sharp edges as graphic images. These techniques may have a smoothing effect on the rendered video, which is beneficial for live TV and for typical TV resolutions. In contrast, bilinear filtering is a basic filter for synthetic or computer-generated scenes.

Video filtering techniques typically use a polyphase filtering algorithm. However, the embodiments described herein are not limited to polyphase filtering, but may use other filtering techniques to filter the video image into multiple resolutions. Polyphase filtering is a video filtering technique that may be used to create the one or more mipmaps of the video image to generate a texture of the video image that may be displayed and rotated on the surface of a multi-dimensional graphics object. The image sizes needed to create the graphics texture of the video image may depend on application specific parameters. This may be done by sending the application specific parameters to the display processing engine. Using polyphase filtering, as described herein, instead of anisotropic filtering, may allow rendering of better video quality for non-rectangular video destinations. Using mipmapping in computer graphics hardware (resulting from polyphase filtering) may be beneficial to display the most appropriate video texture at a particular depth on the video surface of the display.

In one exemplary embodiment, the application that provides the video depth select signal 405 to the processing device 400, and in particular, to the graphics rendering engine 420, may be an application program interface (API), such as Direct3D. Direct3D is an API, owned and developed by Microsoft Corporation, typically used for the creation of 3-D games. Direct3D is used for manipulating and displaying 3-D objects on the display 430. Direct3D provides programmers with a way to develop 3-D programs that can utilize whatever graphics acceleration device is installed in the machine. Most 3-D accelerator cards for personal computers (PCs) support Direct3D. In one embodiment, processing device 400 may reside on a graphics acceleration device. Alternatively, the processing device 400 may reside on a processor. Although the processing device 400 is described as including both the display processing engine 410, and the graphics rendering engine 420, these processing engines may be located on separate integrated circuits. For example, the display processing engine 410 may be located with a processor of a personal computer, and the graphics rendering engine 420 may reside on a graphics accelerator that is coupled to the processor.

Figure 5A:
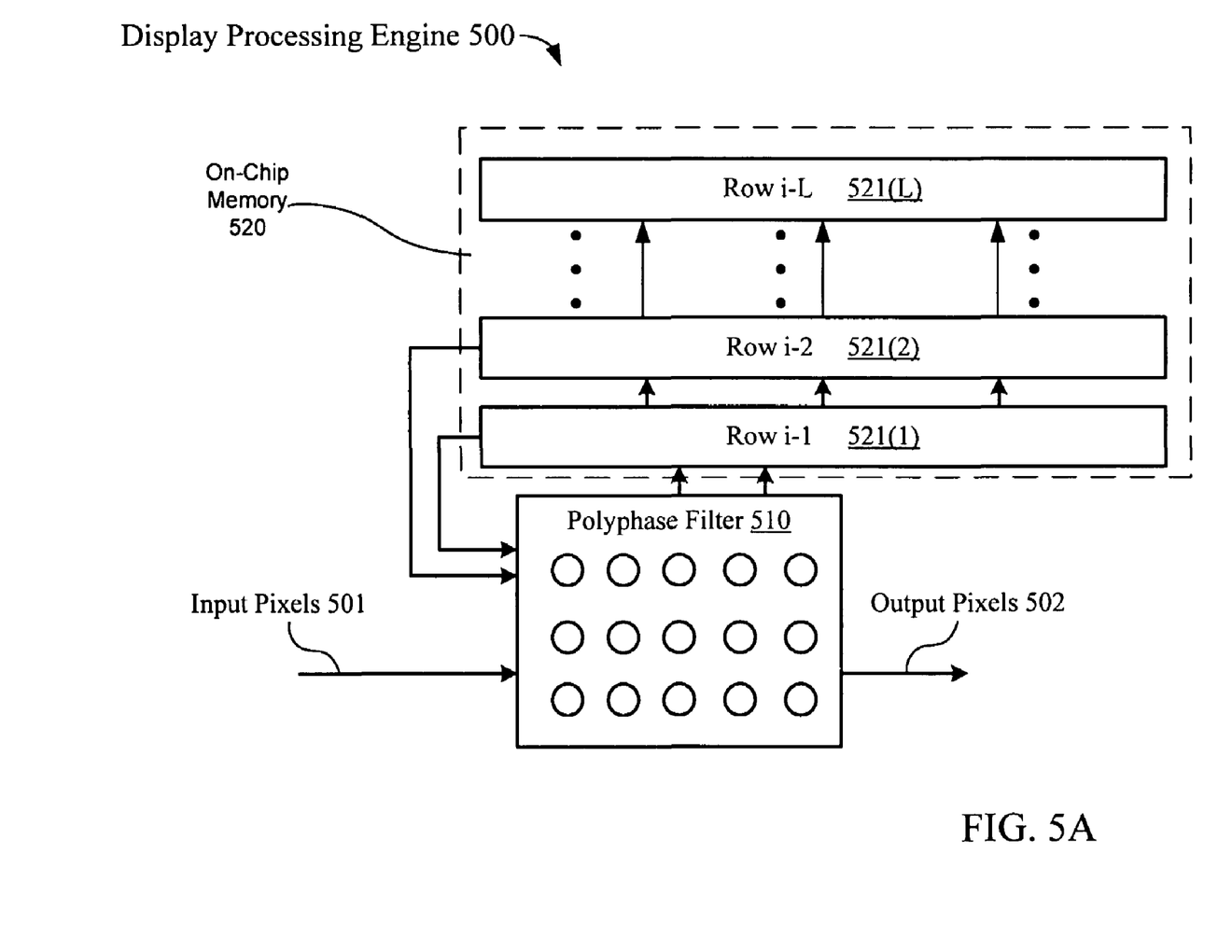
FIG. 5A illustrates a block diagram of one embodiment of a single polyphase filter for receiving video data as input pixels and generating multiple output resolutions as output pixels.

In one embodiment, display processing engine 410 may include on-chip memory 450 and a filter 460. Filter 460 is configured to filter the decoded video 401 into the N levels of filtered video 402 that are provided to the graphics rendering engine 420. Filter 460 may receive the resolution feedback 403 from the graphics rendering engine 420 to set parameters, such as how many levels of filtered video images 402 (e.g., scaled videos) are needed by the application or processor, and what resolutions of the levels are needed to properly render the decoded video 401 as a graphics texture for display on display 430. In one exemplary embodiment, filter 460 is a single polyphase filter, including N×M taps, where N corresponds to the number of horizontal taps, and M corresponds to the number of vertical taps, as illustrated in FIG. 5A. Alternatively, filter 460 may be of other types of filters, known by those of ordinary skill in the art, to generate one or more filtered or scaled images of the input image, such as video filtering and image filtering for computer-generated images. However, it should be noted that using polyphase filtering technique instead other image filtering techniques for computer-generated images may be beneficial because polyphase filtering produces higher quality video filtering than the other image filtering techniques, which may be better for filtering computer-generated images.

On-chip memory 450 may be used to store incoming decoded video 401 as rows of pixels of the input video image to provide as inputs to the filter 460. On-chip memory 450 may also be used for temporary storage of outputs pixels to the filter 460. In another embodiment, on-chip memory 450 may be used to store the plurality of phase coefficients for the filter. On-chip memory 450 may be cache memory, on-chip random access memory (RAM), or other memory types known by those of ordinary skill in the art. It should be noted that on-chip memory 450 may be located external to the processing device 400 and/or display processing engine 410, however, in order to increase speed of computation by the processing device it may be beneficial to have on-chip memory 450 located near the filter 460. In another embodiment, display processing engine 410 may include an input buffer to receive the decoded video 401. Also, as previously mentioned, display processing engine 410 may also include hardware to decode the video image.

In another embodiment, processing device 400 may be coupled to external memory 440. External memory 440 may be used to store the output pixels of the multiple levels of filtered video 402. These output pixels may include the base resolution 302(1), and one or more lower levels of resolution 302(2)-302(N). In another embodiment, the external memory 440 may be used to store the input pixels of the input video image to provide as inputs to the filter 460. In one exemplary embodiment, external memory 440 may be a synchronous RAM (SRAM), such as double data rate (DDR) memory (e.g., DDR, DDR2, and DDR3). Alternatively, external memory 440 may be other memory types known by those of ordinary skill in the art, such as dynamic RAM (DRAM). External memory 440 may also be coupled to graphics rendering engine 420 to provide the N levels of filtered video 402.

FIG. 5A illustrates a block diagram of one embodiment of a single polyphase filter for receiving video data as input pixels and generating multiple output resolutions as output pixels. Display processing engine 500 includes a single polyphase filter 510, and on-chip memory 520. Polyphase filter 510 includes N×M taps, where N corresponds to the number of horizontal taps, and M corresponds to the number of vertical taps. For example, input pixels 501 are read from an input buffer, or alternatively from external memory, and proceed through an N×M polyphase filter 510 to provide output pixels, including multiple (N) levels of filtered video 402. In horizontal filtering, for each vertical tap, a row of pixels 521 (of the input image of input pixels 501) may be filtered with a phase of filter coefficients, which are stored in on-chip memory 520. On-chip memory 520 includes a plurality of rows 521(1)-521(L), where L is a positive integer value. In another embodiment, the on-chip memory 520 may store both the input pixels and the filter coefficients. However, it should be noted that the video image being filtered may be large in memory size, and accordingly, could be stored in external memory, while the phase coefficients could be stored in on-chip memory 520. In vertical filtering, each horizontal tap, a column of pixels of the input image of input pixels 501 may be filtered with a phase of filter coefficients, which are stored in on-chip memory 520. Similarly, the columns of pixels may be stored in on-chip memory 520 or external memory.

A polyphase filter is a finite impulse response (FIR) filter in which the coefficients of the filter changes with each output sample. In one embodiment, the polyphase filter may receive a sequence of input pixels, and a phase of filter coefficients that corresponds to a number of taps. The polyphase filter selects a phase, including a set of filter coefficients, from a plurality of phases, stored in on-chip memory. The polyphase filter selects the phase for every output pixel based on the polyphase algorithm selected. The polyphase filter also selects the number of pixels that corresponds to the number of taps from the sequence of input pixels. These pixels may be received from external memory or an input buffer. The polyphase filter selects the pixels for each output pixel based on the polyphase algorithm selected. Polyphase algorithms are known by those of ordinary skill in the art, and accordingly, details regarding their operation have not been included so as to not obscure the present embodiments.

Figure 5B:
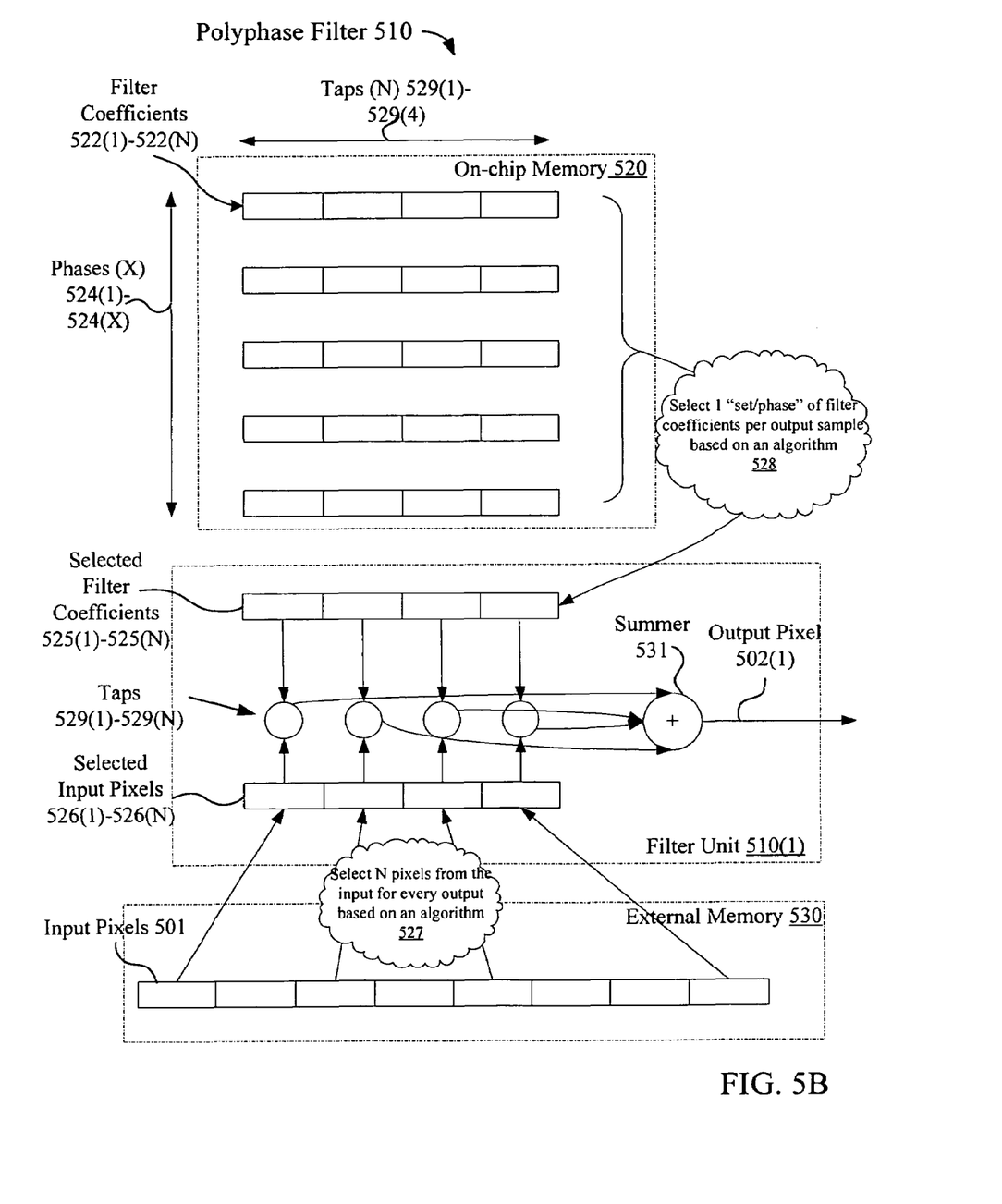
FIG. 5B illustrates a flow diagram of one embodiment of a single polyphase filter for receiving video data and filtering the video data based on filter coefficients of a phase to generate a filtered output pixel.

FIG. 5B illustrates a flow diagram of one embodiment of a single polyphase filter for receiving video data and filtering the video data based on filter coefficients of a phase to generate a filtered output pixel. Polyphase filter 510 of FIG. 5B includes filter unit 510(1), a plurality of filter coefficients (e.g., stored in on-chip memory 520, and a plurality of input pixels (e.g., received from external memory 530). Filter unit 510(1) may be a FIR filter.

Polyphase filter 510 of FIG. 5B, including filter unit 510, includes X distinct sets 524(1)-524(X) of filter coefficients 522(1)-522(N), with each set containing as many coefficients as the number of horizontal taps (N). In other words, polyphase filter 510 is an N×X polyphase filter, meaning N number of horizontal taps and X number of phases. Each of these coefficient sets is called a phase 524(1)-524(X), thereby giving rise to the term polyphase filters. In this case, there will be N coefficients per phase for horizontal filtering. N input pixels 526(1)-526(N) from a row from a video image are selected (e.g., received from external memory 530) along with a single phase 524 of filter values 525(1)-525(N). Both the selected filter coefficients 525(1)-525(N) and the selected input pixels 526(1)-526(N) are filtered, using taps 529(1)-529(N) and summer 531 of filter unit 510(1), to provide one horizontal output pixel 502(1). Taps 529(1)-529(N) are multiplexers that receive the input pixel and the filter coefficient. The resulting products of the multiple taps are provided to summer 531. Summer 531, accordingly, provides the output pixel 502(1). The output pixel 502(1) may then be stored to external memory 440.

The plurality of phases, including the filter coefficients may be stored in on-chip memory 520, and the input pixels may be stored in external memory 530. Alternatively, both the filter coefficients and input pixels may be stored in on-chip memory 520, or both in external memory 530.

It should be noted that although the embodiment of FIG. 5B describe horizontal filtering, the embodiments are not limited to horizontal filtering, but may include vertical filtering. It should be noted that a similar process is used for vertical filtering, except that the operation includes selecting a single phase of filter values from the possible Y phases (e.g., stored in on-chip memory) along with M input pixels selected from a column from a video image (e.g., stored in external memory) and filtering to provide one vertical output pixel. M is the number of vertical taps of the polyphase filter 510.

It is possible to vary the number of phases used for horizontal and vertical filtering, X and Y, respectively. A total of N×X filter coefficients are stored in the on-chip memory for the horizontal filtering. Likewise, M×Y filter coefficients are stored in on-chip memory for vertical filtering. The polyphase filter coefficients are computed based on the desired scaling ratio. As previously described, N (or M) input pixels from a row (or column) from a video image are selected (e.g., received from external memory) (527) along with a single phase of filter values containing N (or M) filter coefficients (528) and filtered to form one horizontal (or vertical) output pixel. Numerous algorithms for selecting the phase and the set of N input pixels exist. The operation in which the input samples and the filter coefficient set are chosen is dependent on the scaling ratio.

In another embodiment, a common filtering pipeline may be established for the creation of multiple resolution images. For example, two or more polyphase filters, having N×M taps, may be used in parallel or in series. The filtering pipeline may have corresponding pixel memory for the corresponding stages, or alternatively, may share pixel memory. Described below are two ways that this structure may be extended to support output of multiple resolutions of images (e.g., video images). Alternatively, other configurations may be used to extend the structure to support output of multiple resolutions of images.

Figure 6:
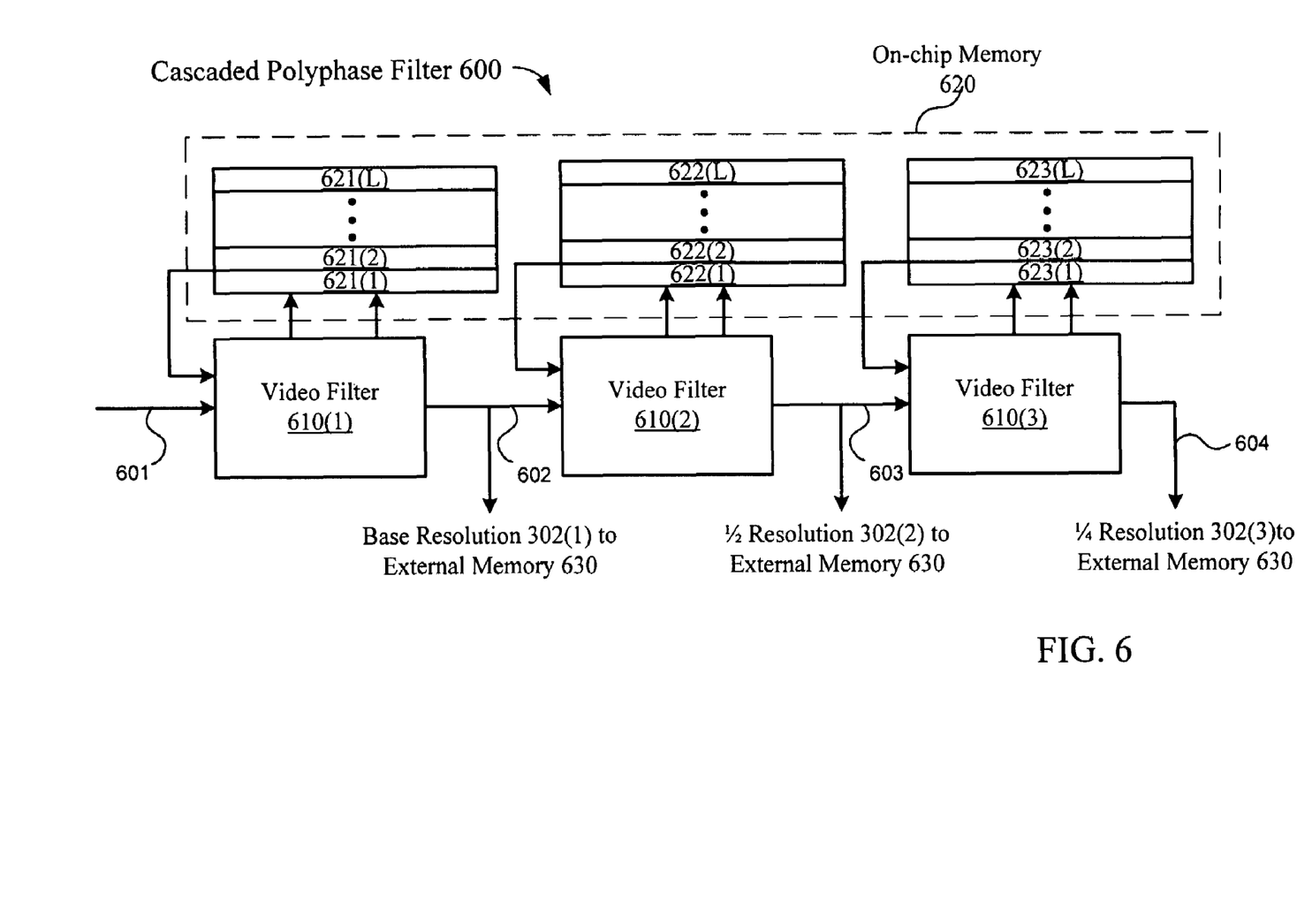
FIG. 6 illustrates a block diagram of one embodiment of a cascaded polyphase filter having multiple filters connected in series for generating multiple output resolutions of input video data.

FIG. 6 illustrates a block diagram of one embodiment of a cascaded polyphase filter having multiple filters connected in series for generating multiple output resolutions of input video data. Cascaded polyphase filter 600 includes a plurality of filters 610(1)-610(3) and on-chip memory 620. Although, as illustrated as including only three filters, cascaded polyphase filter 600 may include more or less than three filters. On-chip memory 620 includes a plurality of rows, 621(1)-621(L), 622(1)-622(L), and 623(1)-(L), where L is a positive integer value. It should be noted that these memory rows may reside on a single memory module, such as on-chip memory 620, or alternatively, they may reside on separate memory modules.

In a cascaded structure, the first video filter 610(1) filters the input pixels 601 of decoded video 401, and outputs output pixels on line 602, the output resolution, base resolution 302(1). The output pixels on line 602 are written to external memory 630 (e.g., DDR), and is also input into the input to the second video filter 610(2). Second video filter 610(2) filters the base resolution 302(1), received on line 602, to produce the second resolution 302(2) (e.g., ½ resolution). The second resolution 302(2) is output on line 603, is written to external memory 630, and is also input into the input to the third video filter 610(3). Third video filter 610(3) filters the second resolution 302(2) (e.g., ½ resolution), received on line 603, to produce the third resolution 302(3) (e.g., ¼ resolution). The third resolution 302(3) is output on line 604, is written to external memory 630, and may also be input into a subsequent filter (not illustrated). One advantage of this approach may be that the external memory bandwidth is optimized, and is equivalent to one read operation of the input image, and one write operation for each of the sub-images, which is far less than requiring one read operation and one write operation for each stage of the filtering (e.g., scaling) process.

Figure 7:
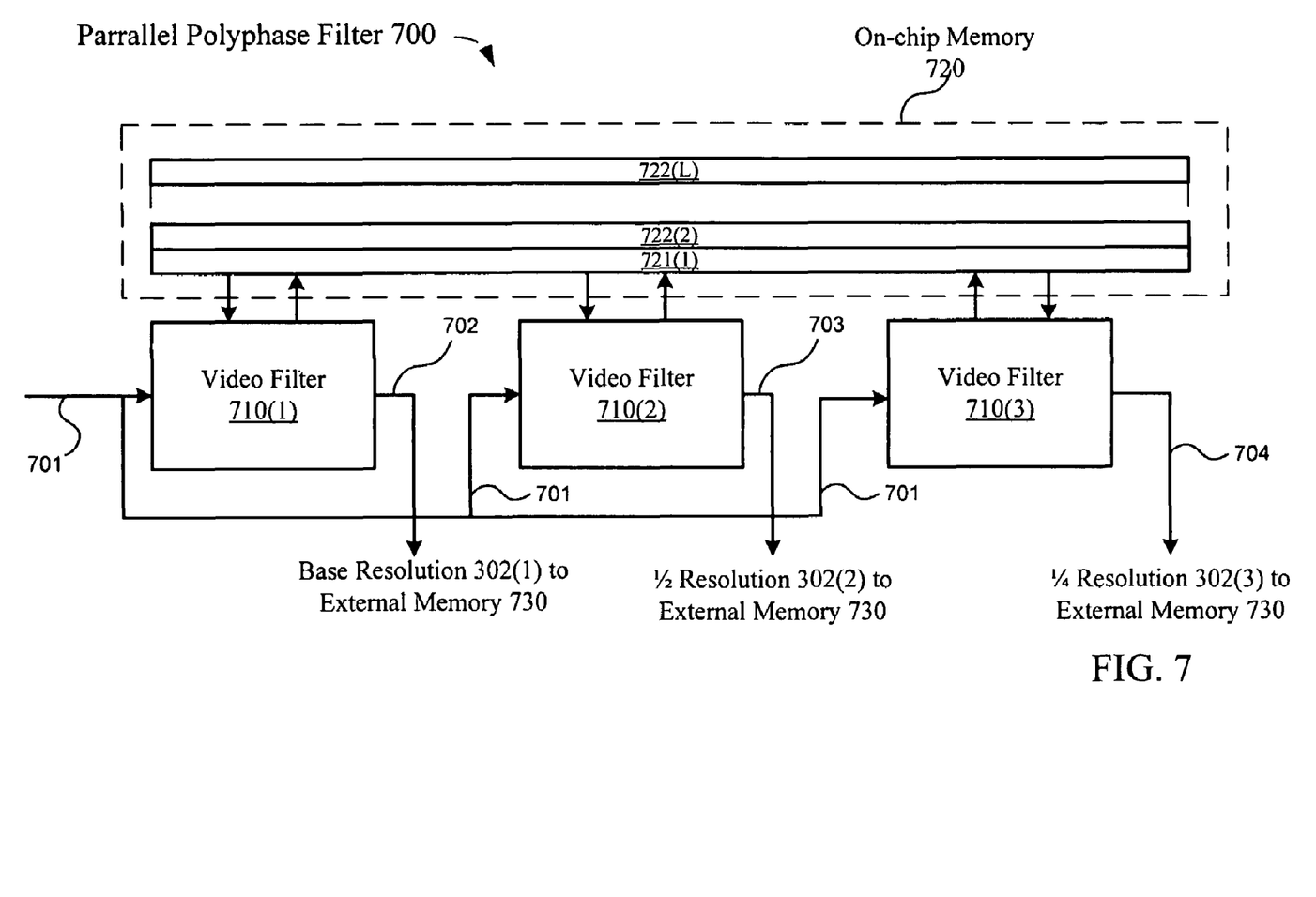
FIG. 7 illustrates a block diagram of one embodiment of a parallel polyphase filter having multiple filters connected in parallel for generating multiple output resolutions of input video data.

FIG. 7 illustrates a block diagram of one embodiment of a parallel polyphase filter having multiple filters connected in parallel for generating multiple output resolutions of input video data. Parallel polyphase filter 700 includes a plurality of filters 710(1)-710(3) and on-chip memory 720. Although, as illustrated as including only three filters, parallel polyphase filter 700 may include more or less than three filters. On-chip memory 720 includes a plurality of rows, 721(1)-721(L), where L is a positive integer value.

In the parallel structure, each filter receives the same input and produces three different outputs. More particularly, first video filter 710(1), second video filter 710(2), and third video filter 710(3) all receive the same input pixels 701 of decoded video 401, and output different output pixels on lines 702, 703, and 704 to be written to external memory 730. First video filter 710(1) filters the input pixels 701 to produce the base resolution 302(1). Second video filter 710(2) filters the input pixels 701 to produce the second resolution 302(2) (e.g., ½ resolution). Third video filter 710(3) filters the input pixels 701 to produce the third resolution 302(3) (e.g., ¼ resolution). In another embodiment, additional filters may be added to the pipeline, and may filter additional resolutions. In this parallel design, since each filter is receiving the same input, it is possible for them to share a common on-chip memory (e.g., 720) for storing rows of pixels (e.g., 722(1)-722(L). This may yield significant area savings on the chip (e.g., integrated circuit), and also allows for the memory bandwidth savings as described above with respect to the cascaded design. Alternatively, separate blocks of rows of memory may be used for each stage of the pipeline (e.g., for each corresponding filter), as described and illustrated in FIG. 6. These separate blocks of rows of memory may reside in a single memory module or multiple memory modules.

The embodiments, described herein, may be used to enhance the quality of video images while providing the capability of enhanced graphical user interfaces and video presentation techniques. As previously mentioned, conventional display processing engines, typically, only filter the video at one resolution. Embodiments described herein may enhance the display processing engine by creating many sub-images in addition to the base image that has a base resolution. For example, the display processing engine may create sub-images having a resolution of ½, ¼, ⅛, ¹⁄₁₆, etc., of the base resolution of the base image. This may be done for each video frame. These embodiments may be used in various consumer electronics that use rotation of a video on the video surface of a display, such as a DTV, TV, monitor, handheld multi-media device, personal data assistant (PDA), IP-STB, laptop computers, handheld video players, cable STBs, satellite STBs, handheld gaming devices, or other consumer electronics for displaying video and/or graphics.

In one embodiment, a method for rendering a video image as a texture using multiple levels of resolution of the video image may include generating one or more graphics textures of a video image, wherein the one or more graphics textures have differing resolutions, and rendering the video image as a graphics texture at differing depths using the one or more graphics textures of differing resolutions. Rendering may include rendering the video image as the graphics texture on a surface of a multi-dimensional graphics object using the one or more graphics textures of differing resolutions of the video image. Generating one or more graphics textures of the video image may include generating one or more levels (e.g., mipmaps or mipmap levels) of the video image using a base video frame of data and one or more scaled video frames of data, wherein the one or more scaled video frames have a smaller resolution of the video image than a resolution of the base video frame of data, and generating the one or more graphics textures of the video image based on the one or more generated mipmaps levels, and wherein rendering the video image further comprises rendering the video image as the graphics texture at differing depths using the one or more mipmap levels on a surface of a multi-dimensional graphics object.

In another embodiment, the method may include generating a mipmap level or graphic texture of the video frame having a first resolution, and generating one or more scaled mipmap levels or graphic textures of the video frame, wherein resolutions of the one or more scaled mipmap levels are smaller than the first resolution, where rendering the video frame as the graphics texture includes rendering the video frame as the graphics texture on a surface of a multi-dimensional graphics object using at least one of the mipmap level or one or more scaled mipmap levels of the video frame.

In one embodiment, the method may include displaying the surface of the multi-dimensional graphics object having the graphics texture of the video image on the surface (e.g., planar or spherical surface) of the multi-dimensional graphics object. In another embodiment, the method may include decoding the video image into the base video frame of data, filtering (scaling or downscaling) the base video frame of data into one or more scaled video frames of data, and mipmapping the video image as the graphics texture of the video image for rendering the graphics texture at various depths using the one or more graphics textures have differing resolutions.

In another embodiment, the method may also include rotating the multi-dimensional graphics object, wherein rotating the multi-dimensional graphics object comprises rendering the graphics texture at various depths using the one or more graphics textures have differing resolutions. Rotating the 3-D object on the 2-D display may include rotating the graphics texture in the z-axis with the multi-dimensional object. Rotating the graphics texture may include rendering a second texture including one or more mipmap levels of the base video frame of data at various (one or more) depth levels on the video surface.

Embodiments of the present invention include various operations, which will be described below. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; electrical, optical, acoustical, or other form of propagated signal (e.g., carrier waves, infrared signals, digital signals, etc.); or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

The processing device(s) described herein may include one or more general-purpose processing devices such as a microprocessor or central processing unit, a controller, or the like. Alternatively, the processing device may include one or more special-purpose processing devices such as a digital signal processor (DSP), an application specific integrated circuit (ASIC), a field programmable gate array (FPGA), or the like. In an alternative embodiment, for example, the processing device may be a network processor having multiple processors including a core unit and multiple microengines. Additionally, the processing device may include any combination of general-purpose processing device(s) and special-purpose processing device(s).

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method, comprising:
    generating one or more mipmap levels of a video image using a base video frame of data and one or more scaled video frames of data;
    generating one or more graphics textures of the video image based on the one or more mipmap levels, wherein the one or more graphics textures have differing resolutions; and
    rendering the video image as a graphics texture using the one or more graphics textures of differing resolutions.

2. The method of claim 1, wherein rendering the video image as the graphics texture further comprises rendering the video image as the graphics texture on a surface of a multi-dimensional graphics object using the one or more graphics textures of differing resolutions of the video image.

3. The method of claim 1,
    wherein the one or more scaled video frames have a smaller resolution of the video image than a resolution of the base video frame of data
    and wherein rendering the video image further comprises rendering the video image as the graphics texture using the one or more mipmap levels on a surface of a multi-dimensional graphics object.

4. The method of claim 2, further comprising displaying the surface of the multi-dimensional graphics object having the graphics texture of the video image on the surface of the multi-dimensional graphics object.

5. The method of claim 4, wherein the surface is at least one of a planar surface, spherical surface, or arbitrary surface.

6. The method of claim 4, further comprising rotating the multi-dimensional graphics object, wherein rotating the multi-dimensional graphics object comprises rendering the graphics texture at various depths using the one or more graphics textures have differing resolutions.

7. The method of claim 1, wherein generating the one or more mipmap levels of the video image comprises:
    decoding the video image into the base video frame of data; and
    filtering the base video frame of data into the one or more scaled video frames of data, and wherein generating the one or more graphics textures comprises mipmapping the base video frame of data and the one or more scaled video frames of data of the video image as the one or more graphics textures for rendering the graphics texture at various depths.

8. The method of claim 1, wherein generating the one or more graphics textures have differing resolutions further comprises:

selecting a pair of scaled video frames of at least one of the base frame of data or the one or more scaled video frames of data; and mipmapping the video image as the graphics texture using the pair of scaled video frames for rendering the graphics texture at various depths.

9. The method of claim 7, wherein filtering the base video frame of data comprises filtering the base video frame of data using video filtering.

10. The method of claim 9, wherein the video filtering is polyphase filtering.

11. The method of claim 7, wherein filtering the base video frame of data comprises filtering the base video frame of data using an image filtering technique for computer-generated images.

12. The method of claim 11, wherein the image filtering technique for computer-generated images is at least one of point-sampling filtering, bi-linear filtering, tri-linear filtering, or anisotropic filtering.

13. The method of claim 7, wherein filtering the base video frame of data comprises:

scaling the base video frame of data into a first scaled video frame of data; and scaling the base video frame of data into a second scaled video frame of data using the first scaled video frame of data.

14. The method of claim 7, wherein filtering the base video frame of data comprises:

scaling the base video frame of data into a first scaled video frame of data; and scaling the base video frame of data a second scaled video frame of data using the base video frame of data.

15. The method of claim 6, wherein rendering the graphics texture at various depths comprises:

rendering a first graphics texture of the one or more graphics textures of the video image at a first depth on the surface of the multi-dimensional graphics object; and rendering a second graphics texture of the one or more graphics textures of the video image at a second depth on the surface of the multi-dimensional graphics object.

16. The method of claim 6, further comprising rotating the multi-dimensional graphics object on a two-dimensional (2-D) display away from a viewer of the display, and wherein rendering the rendering the graphics texture at various depths comprises:

rendering a first graphics texture of the one or more graphics textures of the video image at a first depth on the surface of the multi-dimensional graphics object; and rendering a second graphics texture of the one or more graphics textures of the video image at a second depth on the surface of the multi-dimensional graphics object.

17. An apparatus, comprising:

a display processing engine to generate one or more mipmap levels of a video image using a based video frame of data and one or more scaled video frames of data, and to generate one or more graphics textures of the video image based on the one or more mipmap levels, wherein the one or more graphics textures have differing resolutions; and a graphics rendering engine coupled to the display processing engine, the graphics rendering engine to render the video image as a graphics texture using the one or more graphics textures of differing resolutions.

18. The apparatus of claim 17, further comprising a display coupled to the graphics rendering engine, the display to display the rendered video image.

19. The apparatus of claim 18, wherein the display processing engine comprises:

a video filter; and a memory coupled to the video filter.

20. The apparatus of claim 19, wherein the video filter comprises a polyphase filter, wherein the polyphase filter comprises:

a plurality of taps coupled to the memory, wherein the taps are operable to receive a phase of a plurality of phases, wherein each phase comprises a plurality of filter coefficients, wherein the polyphase filter is operable to receive a plurality of input pixels, wherein a number of input pixels is equal to a number of taps, and wherein each tap is operable to multiply one filter coefficient of the received phase and one input pixel of the plurality of input pixels; and a summer coupled to outputs of the plurality of taps, wherein the summer is operable to sum the outputs of the plurality of taps to provide one output pixel.

21. The apparatus of claim 19, wherein the video filter comprises a cascaded structure, wherein the cascaded structure comprises two or more video filters, and wherein an output of a first video filter is coupled to the input of a second video filter.

22. The apparatus of claim 21, wherein the outputs of the two or more video filters are coupled to an external memory, and wherein the outputs of the two or more video filters have different resolutions.

23. The apparatus of claim 19, wherein the video filter comprises a parallel structure, wherein the parallel structure comprises two or more video filters, and wherein outputs of the two or more video filters are coupled to an external memory, and wherein the two or more video filters receive input pixels of the video image and provide output pixels of different resolutions to the external memory.

24. The apparatus of claim 17, further comprising a resolution feedback line coupled to the graphics rendering engine and the display processing engine, the resolution feedback line to permit the graphics rendering engine to set filtering parameters of the display processing engine.

25. The apparatus of claim 24, further comprising a depth select signal received by the graphics rendering engine from an application, the depth select signal to indicate a depth of a surface of a multi-dimensional graphics object for the application, wherein the depth of the surface is used to select a number of graphics textures of the video image to render the video image as the graphics texture at the depth of the surface of the multi-dimensional graphics object.

26. A system, comprising:

a first integrated circuit;

a second integrated circuit coupled to the first integrated circuit, wherein the first integrated circuit comprises:

a display processing engine to generate one or more mipmap levels of a video image using a based video frame of data and one or more scaled video frames of data, and to generate one or more graphics textures of the video image based on the one or more mipmap levels, wherein the one or more graphics textures have differing resolutions; and a graphics rendering engine coupled to the display processing engine, the graphics rendering engine to render the video image as a graphics texture using the one or more graphics textures of differing resolutions.

27. The system of claim 26, wherein the first integrated circuit is a memory, and wherein the second integrated circuit is a processor.

28. The system of claim 26, wherein the second integrated circuit resides on an accelerated graphics card.

29. An apparatus, comprising:

means for generating one or more mipmap levels of a video image using a base video frame of data and one or more scaled video frames of data;

means for generating one or more graphics textures of the video image based on the one or more mipmap levels of the video image, wherein the one or more graphics textures have differing resolutions; and means for rendering the video image as a graphics texture using the one or more graphics textures of differing resolutions.

30. The apparatus of claim 29, further comprising:

means for rendering the video image as the graphics texture on a surface of an adjustable multi-dimensional graphics object using the one or more graphics textures of differing resolutions of the video image; and means for displaying the video image on the surface of the adjustable multi-dimensional graphics object.

* * * * *